United States Patent
Sato et al.

(10) Patent No.: US 10,252,218 B2
(45) Date of Patent: Apr. 9, 2019

(54) ELECTRODEIONIZATION DEVICE AND PURE-WATER PRODUCTION SYSTEM

(71) Applicant: KURITA WATER INDUSTRIES LTD., Tokyo (JP)

(72) Inventors: Shin Sato, Tokyo (JP); Yoichi Miyazaki, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 14 days.

(21) Appl. No.: 15/540,198

(22) PCT Filed: Feb. 15, 2016

(86) PCT No.: PCT/JP2016/054258
§ 371 (c)(1),
(2) Date: Jun. 27, 2017

(87) PCT Pub. No.: WO2016/133041
PCT Pub. Date: Aug. 25, 2016

(65) Prior Publication Data
US 2017/0354932 A1    Dec. 14, 2017

(30) Foreign Application Priority Data

Feb. 17, 2015    (JP) .................................. 2015-028736

(51) Int. Cl.
| | | |
|---|---|---|
| *B01D 61/48* | (2006.01) | |
| *B01D 61/08* | (2006.01) | |
| *B01D 61/58* | (2006.01) | |
| *C02F 1/44* | (2006.01) | |
| *C02F 1/469* | (2006.01) | |
| *C02F 1/42* | (2006.01) | |
| *B01D 61/02* | (2006.01) | |
| *C02F 1/00* | (2006.01) | |
| *C02F 1/20* | (2006.01) | |
| *C02F 1/24* | (2006.01) | |
| *C02F 1/28* | (2006.01) | |
| *C02F 1/32* | (2006.01) | |
| *C02F 1/52* | (2006.01) | |
| *C02F 101/10* | (2006.01) | |

(52) U.S. Cl.
CPC .............. *B01D 61/48* (2013.01); *B01D 61/08* (2013.01); *B01D 61/485* (2013.01); *B01D 61/58* (2013.01); *C02F 1/42* (2013.01); *C02F 1/44* (2013.01); *C02F 1/469* (2013.01); *C02F 1/4695* (2013.01); B01D 61/025 (2013.01); C02F 1/001 (2013.01); C02F 1/20 (2013.01); C02F 1/24 (2013.01); C02F 1/283 (2013.01); C02F 1/32 (2013.01); C02F 1/441 (2013.01); C02F 1/444 (2013.01); C02F 1/52 (2013.01); C02F 2001/427 (2013.01); C02F 2101/108 (2013.01); *C02F 2201/46115* (2013.01); *Y02A 20/131* (2018.01); *Y02A 20/134* (2018.01)

(58) Field of Classification Search
CPC ..... B01D 61/48; B01D 61/485; C02F 1/4695; C02F 1/441
See application file for complete search history.

(56) References Cited

U.S. PATENT DOCUMENTS

| | | | |
|---|---|---|---|
| 5,154,809 A | 10/1992 | Oren et al. | |
| 6,071,397 A | 6/2000 | Terada et al. | |
| 6,365,023 B1 * | 4/2002 | De Los Reyes ....... | B01D 61/48 204/524 |
| 6,379,518 B1 | 4/2002 | Osawa et al. | |
| 6,514,398 B2 * | 2/2003 | DiMascio .............. | B01D 61/48 204/524 |
| 2006/0249390 A1 | 11/2006 | Yan et al. | |
| 2006/0266651 A1 | 11/2006 | Iwasaki | |

FOREIGN PATENT DOCUMENTS

| | | |
|---|---|---|
| JP | H03-207487 A | 9/1991 |
| JP | H10-258289 A | 9/1998 |
| JP | 2001-113281 A | 4/2001 |
| JP | 2002-001345 A | 1/2002 |
| JP | 2005-193205 A | 7/2005 |
| JP | 2008-068198 A | 9/2006 |
| JP | 2007-534453 A | 11/2007 |
| JP | 2009-028695 A | 2/2009 |
| JP | 2011-110515 A | 6/2011 |
| JP | 2012-139687 A | 7/2012 |

OTHER PUBLICATIONS

PCT/ISA/210, "International Search Report for International Application No. PCT/JP2016/054258," dated May 24, 2016.
Japanese Office Action of JP Application No. 2015-028736 dated May 17, 2016.

* cited by examiner

*Primary Examiner* — Arun S Phasge
(74) *Attorney, Agent, or Firm* — Manabu Kanesaka

(57) ABSTRACT

An electrodeionization device having an improved boron rejection capability compared with high-performance electrodeionization devices proposed in the related art is provided. An electrodeionization device comprising a cathode; an anode; and a plurality of cation-exchange membranes and a plurality of anion-exchange membranes, the plurality of cation-exchange membranes and the plurality of anion-exchange membranes being arranged between the cathode and the anode so as to form concentrating compartments and desalting compartments, the concentrating compartments and desalting compartments being arranged alternately, the desalting compartments being filled with an ion-exchange resin, wherein the ion-exchange resin has an average particle size of 100 to 300 μm. Preferably, the ion-exchange resin has a uniformity coefficient of 1.1 or less.

9 Claims, No Drawings

ELECTRODEIONIZATION DEVICE AND PURE-WATER PRODUCTION SYSTEM

TECHNICAL FIELD

The present invention relates to an electrodeionization device and a pure-water production system that enable a high degree of rejection of boron contained in water to be treated and a method for producing deionized water with the electrodeionization device.

BACKGROUND ART

An ultrapure-water production system for producing ultrapure water from raw water such as city water, groundwater, or industrial water includes a pretreatment subsystem, a primary pure-water production subsystem, and a secondary pure-water production subsystem. The pretreatment subsystem includes a coagulation apparatus, a floatation apparatus, a filtration apparatus, a clarification-membrane apparatus, and the like. The primary pure-water production subsystem includes one or more apparatus selected from an active-carbon adsorption column, an ultraviolet (UV) oxidation apparatus, a chemical oxidation apparatus, a degassing apparatus, and the like and a desalting apparatus. The desalting apparatus includes one or more devices selected from a reverse-osmosis (RO) membrane separation device, an electrodeionization device, and an ion-exchange device (a mixed-bed ion-exchange device or an ion-exchange pure water device). The secondary pure-water production subsystem includes device units similar to those included in the primary pure-water production subsystem as needed. A common second pure-water production subsystem includes a low-pressure UV oxidation device, a mixed-bed ion-exchange device, and an ultrafiltration (UF) membrane separation device.

Among the above device units, the RO membrane separation device, the electrodeionization device, and the mixed-bed ion-exchange device are responsible for the desalting of raw water; the RO membrane separation device and the UF membrane separation device are responsible for the rejection of microparticles contained in raw water; and the RO membrane separation device, the ion-exchange pure water device, and the low-pressure UV oxidation device are responsible for the rejection of TOC components.

Strict water quality standards, such as a boron concentration of 1 ppt or less, have been applied to the production of ultrapure water.

It has been proposed to use a high-performance electrodeionization device capable of achieving a high boron rejection (e.g., "KCDI-UPz" produced by Kurita Water Industries Ltd.) for deionization of water with a combination of an RO membrane separation device. However, the boron rejection of the high-performance electrodeionization devices is about 99.9% at the highest. Therefore, when water to be treated having a boron concentration of about 20 ppb for example is treated with an RO membrane separation device to produce RO permeate water having a boron concentration of about 10 ppb, and the permeate water is then treated with an electrodeionization device having a boron rejection of 99.9%, the boron concentration in the treated water (deionized water by the electrodeionization device) is 10 ppt at the lowest. In other words, it is not possible to produce treated water having a boron concentration of 1 ppt or less.

Common electrodeionization devices include a cathode, an anode, and a plurality of cation-exchange membranes and anion-exchange membranes that are arranged alternately between the cathode and the anode so as to form concentrating compartments and desalting compartments that are arranged alternately. The desalting compartments are filled with an ion-exchange resin. In some electrodeionization devices, the concentrating compartments are also filled with an ion-exchange resin.

Ion-exchange resins filled in desalting compartments and concentrating compartments included in the electrodeionization devices used in the related art have a particle size of about 500 to 600 μm. The uniformity in the particle size of the ion-exchange resin has not been considered.

Desalting compartments of an electrodeionization device in Examples of Patent Literature 1 are filled with an anion-exchange resin "DIAION (registered trademark) SA10A" (average particle size: 540 μm) produced by Mitsubishi Chemical Corporation and a cation-exchange resin "DIAION (registered trademark) SK1B" (average particle size: 620 μm) produced by Mitsubishi Chemical Corporation.

Patent Literature 2 proposes a deionized-water production system including desalting compartments filled with a mixture of groups of ion-exchange resin particles which have different uniform particle sizes. The particle size of a group of ion-exchange resin particles which has the largest uniform particle size is 1.5 times or more the particle size of a group of ion-exchange resin particles which has the smallest uniform particle size. Although it is described in Patent Literature 2 that the particle size of the group of ion-exchange resin particles which has the smallest uniform particle size is 30 to 600 μm, the ion-exchange resin actually used in Examples of Patent Literature 2 is a mixture of a cation-exchange resin having an average particle size of 630 μm, a cation-exchange resin having an average particle size of 220 μm, and an anion-exchange resin having an average particle size of 575 μm at a ratio of 25:22.5:52.5 (weight ratio).

It is described in Examples of Patent Literature 3 that a molded article of an ion-exchange resin is filled in desalting compartments. The article is formed by molding a cation-exchange resin having an average particle size of 600 μm and an anion-exchange resin having an average particle size of 550 μm with a binder.

Patent Literature 1: Japanese Patent Publication 2001-113281A

Patent Literature 2: Japanese Patent Publication H10-258289A

Patent Literature 3: Japanese Patent Publication 2002-1345A

SUMMARY OF INVENTION

An object of the present invention is to provide an electrodeionization device having an improved boron rejection capability compared with high-performance electrodeionization devices proposed in the related art, a method for producing deionized water with the electrodeionization device, and a pure-water production system including the electrodeionization device.

The inventors of the present invention conducted extensive studies in order to address the above issues and, as a result, found that a high degree of rejection of boron contained in water to be treated can be achieved by using uniformly sized ion-exchange resin particles having a smaller size than the ion-exchange resin particles used in the related art as an ion-exchange resin particles charged in desalting compartments and concentrating compartments included in an electrodeionization device.

The present invention was made on the basis of the above findings. The summary of the present invention is as follows.

[1] An electrodeionization device comprising a cathode; an anode; and a plurality of cation-exchange membranes and a plurality of anion-exchange membranes, the plurality of cation-exchange membranes and the plurality of anion-exchange membranes being arranged between the cathode and the anode so as to form concentrating compartments and desalting compartments, the concentrating compartments and desalting compartments being arranged alternately, the desalting compartments being filled with an ion-exchange resin, wherein the ion-exchange resin has an average particle size of 100 to 300 µm.

[2] The electrodeionization device according to [1], wherein the ion-exchange resin has a uniformity coefficient of 1.1 or less.

[3] The electrodeionization device according to [1] or [2], wherein the ion-exchange resin is a resin mixture of an anion-exchange resin and a cation-exchange resin.

[4] The electrodeionization device according to [3], wherein the ion-exchange resin on an entry side of the desalting compartments in a water-flow direction is a resin mixture of an anion-exchange resin and a cation-exchange resin at a ratio of Anion-exchange resin:Cation-exchange resin=60 to 90:40 to 10 (dry weight ratio); and the ion-exchange resin on an exit side of the desalting compartments is a resin mixture of an anion-exchange resin and a cation-exchange resin at a ratio of Anion-exchange resin:Cation-exchange resin=40 to 60:60 to 40 (dry weight ratio).

[5] The electrodeionization device according to any one of [1] to [4], wherein the concentrating compartments are filled with an ion-exchange resin having an average particle size of 100 to 300 µm.

[6] The electrodeionization device according to [5], wherein the ion-exchange resin filled in the concentrating compartments has a uniformity coefficient of 1.1 or less.

[7] The electrodeionization device according to [5] or [6], wherein the ion-exchange resin filled in the concentrating compartments is a resin mixture of an anion-exchange resin and a cation-exchange resin.

[8] The electrodeionization device according to [7], wherein the ion-exchange resin filled in the concentrating compartments is a resin mixture of an anion-exchange resin and a cation-exchange resin at a ratio of Anion-exchange resin:Cation-exchange resin=40 to 70:60 to 30 (dry weight ratio).

[9] A method for producing deionized water using the electrodeionization device according to any one of [1] to [8], the method comprising:

passing water to be treated through the desalting compartments of the electrodeionization device;

passing part of water discharged from the desalting compartments through the concentrating compartments in a direction opposite to a direction in which the water-to-be-treated is passed through the desalting compartments; and discharging the remainder of the water discharged from the desalting compartments as treated water.

[10] A pure-water production system comprising the electrodeionization device according to any one of [1] to [8], and a reverse-osmosis membrane separation device disposed upstream of the electrodeionization device.

ADVANTAGEOUS EFFECTS OF INVENTION

According to the present invention, it is possible to achieve a high degree of rejection of boron contained in water to be treated. This enables the production of treated water having a boron concentration of 1 ppt or less.

DESCRIPTION OF EMBODIMENTS

Embodiments of the present invention are described below in detail.

The electrodeionization device according to the present invention includes desalting compartments filled with an ion-exchange resin having an average particle size of 100 to 300 µm. The ion-exchange resin preferably has a uniformity coefficient of 1.1 or less.

The mechanisms by which the boron-rejection capability is enhanced by the electrodeionization device according to the present invention where the ion-exchange resin has an average particle size of 100 to 300 µm, which is smaller than the average particle sizes (about 500 to 600 µm) of the ion-exchange resins used in the related art, have not been clarified, but are presumably as follows.

An ion-exchange resin having an average particle size of 100 to 300 µm has 4 to 5 times the area of the surfaces of the same amount of conventional ion-exchange resin particles having the average particle sizes of about 500 to 600 µm. The area of the surfaces of ion-exchange resin particles are responsible for the adsorption and transfer of boron. The ion-exchange resin having an average particle size of 100 to 300 µm therefore markedly increases the efficiency with which boron adsorbed on the ion-exchange resin transfers into the concentrating compartments by moving on the surfaces of the ion-exchange resin particles filled in the desalting compartments.

When the ion-exchange resin in the desalting compartments has a small particle size but has a uniform particle size such as a uniformity coefficient of 1.1 or less, the porosity of the desalting compartments becomes substantially equal to the porosity of desalting compartments filled with an ion-exchange resin having a large particle size. This advantageously prevents an increase in the differential pressure of water that flows through the desalting compartments.

If the average particle size of the ion-exchange resin filled in the desalting compartments exceeds 300 µm, the advantage of using an ion-exchange resin having a small particle size in the present invention may be reduced. On the other hand, an ion-exchange resin having an average particle size smaller than 100 µm may not be suitable in terms of ease of handling, water-flow resistance, and availability. Accordingly, the average particle size of the ion-exchange resin is preferably 100 µm or more. The ion-exchange resin used in the present invention preferably has an average particle size of 150 to 250 µm.

As described above, the ion-exchange resin used in the present invention preferably has a uniform particle size. Specifically, the uniformity coefficient of the ion-exchange resin is preferably 1.1 or less and is particularly preferably 1.05 or less. The lower limit of the uniformity coefficient of the ion-exchange resin is 1.0. The uniformity coefficient of the ion-exchange resin can be determined by a common method, such as the publicly known calculation method described in "DIAION Manual I" Fourth Edition (October 10, Heisei 20(2008)), pp. 70-71, published by Mitsubishi Chemical Corporation, Separation Materials Dept.

Commercially available ion-exchange resins having the above-described average particle size and uniformity coefficient may be used. For example, the ion-exchange resins described in Examples below may be used. It is also possible to use a commercially available ion-exchange resin having a large particle size by pulverizing the ion-exchange resin, sizing the pulverized particles, and then controlling the size of the particles.

An ion-exchange resin filled in the desalting compartments is usually a resin mixture of an anion-exchange resin and a cation-exchange resin. Accordingly, it is preferable that the anion-exchange resin and the cation-exchange resin each have the above-described average particle size and uniformity coefficient. It is also preferable that the anion-exchange resin and the cation-exchange resin have a substantially equal average particle size (the term "equal" used above means that the difference in average particle size is 100 μm or less) and a substantially equal uniformity coefficient (the term "equal" used above means that the difference in uniformity coefficient is 0.05 or less).

The mixing ratio between the anion-exchange resin and the cation-exchange resin constituting the resin mixture filled in the desalting compartments are preferably Anion-exchange resin:Cation-exchange resin=60 to 90:40 to 10 and is particularly preferably 60 to 80:40 to 20 (dry weight ratio). The mixing ratio in the resin mixture charged in the desalting compartments may be uniform over the entire desalting compartments so as to fall within the above specific range. Alternatively, the mixing ratio in the resin mixture on the entry side of the desalting compartments in the direction in which water is passed through the desalting compartments may be different from that on the exit side of the desalting compartments. For example, a region of the desalting compartments which extends ½ to ⅓ the length of the water-flow channel from the entry-side (upstream) end of the desalting compartments may be filled with a resin mixture of an anion-exchange resin and a cation-exchange resin at a mixing ratio of Anion-exchange resin:Cation-exchange resin=60 to 90:40 to 10 or preferably 70 to 80:30 to 20 (dry weight ratio), and the other region (the exit-side region) of the desalting compartments may be filled with a resin mixture of an anion-exchange resin and a cation-exchange resin at a mixing ratio of Anion-exchange resin:Cation-exchange resin=40 to 60:60 to 40 or preferably 50 to 60:50 to 40 (dry weight ratio).

This enables anions to be effectively rejected on the entry side of the desalting compartments and creates an alkaline atmosphere, which promotes the ionization of carbonic acid, silica, and boron and increases the likelihood of carbonic acid, silica, and boron being rejected in the electrodeionization device.

In the electrodeionization device according to the present invention, it is preferable to fill the concentrating compartments also with an ion-exchange resin in order to achieve a high boron rejection percentage. The average particle size of the ion-exchange resin filled in the concentrating compartments is preferably 100 to 300 μm and is more preferably 150 to 250 μm and the uniformity coefficient of the ion-exchange resin charged in the concentrating compartments is preferably 1.1 or less and is more preferably 1.0 to 1.05 for the same reasons as for the ion-exchange resin charged in the desalting compartments.

The ion-exchange resin filled in the concentrating compartments is also preferably a resin mixture of an anion-exchange resin and a cation-exchange resin and is particularly preferably a resin mixture including an anion-exchange resin and a cation-exchange resin at a ratio of Anion-exchange resin:Cation-exchange resin=40 to 70:60 to 30 or preferably 50 to 70:50 to 30 (dry weight ratio).

As described above, the electrodeionization device according to the present invention has a structure similar to the structures of common electrodeionization devices that include a cathode, an anode, and a plurality of cation-exchange membranes and anion-exchange membranes that are arranged alternately between the cathode and the anode so as to form concentrating compartments and desalting compartments that are arranged alternately, except that the specific ion-exchange resin is used as an ion-exchange resin that is charged in the desalting compartments and is preferably charged also in the concentrating compartments.

The thickness of the desalting compartments (the distance between an adjacent pair of an anion-exchange membrane and a cation-exchange membrane that define each of the desalting compartments) is preferably small from the viewpoint of ion migration efficiency, that is, migration distance, but is preferably large from the viewpoint of ease of the production of the device. The thickness of the desalting compartments is preferably 2.0 to 8.0 mm.

The thickness of the concentrating compartments is preferably substantially equal to that of the desalting compartments.

In the method for producing deionized water according to the present invention, water to be treated is deionized by being passed through the above-described electrodeionization device according to the present invention. In order to achieve a high boron rejection percentage, after water to be treated has been passed through the desalting compartments included in the electrodeionization device, part of the treated water (water discharged from the desalting compartments), that is, for example, about 10% to 30% of the amount of treated water, is preferably passed through concentrating compartments in a direction opposite to the direction in which water is passed through the desalting compartments. The velocity at which water is passed through the electrodeionization device is preferably set such that water is passed through the desalting compartments at an LV of about 50 to 150 m/hr and water is passed through the concentrating compartments at an LV of about 10 to 30 m/hr in consideration of boron rejection percentage and treatment efficiency.

The current density of the electrodeionization device at the time during which water to be treated is passed through the electrodeionization device is preferably 500 $mA/dm^2$ or more, that is, for example, 1000 to 1500 $mA/dm^2$.

The electrodeionization device according to the present invention is particularly preferably used as an electrodeionization device disposed downstream of an RO membrane separation device included in a pure-water production system. It is possible to efficiently produce treated water having a boron concentration of 1 ppt or less by treating RO permeate water discharged from the RO membrane separation device, which has a boron concentration of about 10 to 20 ppb, with the electrodeionization device according to the present invention.

The pure-water production system according to the present invention includes an RO membrane separation device and the electrodeionization device according to the present invention which is disposed downstream of the RO membrane separation device. The number of RO membrane separation devices is not limited to one; two or more RO membrane separation devices may be arranged in series. A pretreatment subsystem including an active-carbon column, a coagulation apparatus, a floatation apparatus, a filtration apparatus, a clarification-membrane apparatus, and the like may be optionally disposed upstream of the RO membrane separation device. A UV oxidation apparatus and a degassing-membrane apparatus may also be optionally interposed between the RO membrane separation device and the electrodeionization device. A UV oxidation apparatus, a mixed-bed ion-exchange device, and a UF membrane separation device may also be optionally disposed downstream of the electrodeionization device.

EXAMPLES

The present invention is described more specifically with reference to Examples below.

Example 1

As an anion-exchange resin, "DIAION (registered trademark) UMA150" (average particle size: 200 μm, uniformity coefficient: 1.03) produced by Mitsubishi Chemical Corporation was used. As a cation-exchange resin, "DIAION (registered trademark) UBK550" (average particle size: 200 μm, uniformity coefficient: 1.05) produced by Mitsubishi Chemical Corporation was used. An electrodeionization device ("KCDI-UPz" produced by Kurita Water Industries Ltd.) including an anode, and a cathode, and a plurality of anion-exchange membranes and a plurality of cation-exchange membranes that were arranged alternately between the anode and the cathode so as to form concentrating compartments and desalting compartments that were arranged alternately was prepared such that the direction in which water was passed through the desalting compartments was perpendicular to the direction in which water was passed through the concentrating compartments. An ion-exchange resin was charged into the desalting compartments and the concentrating compartments in the following manner. The thickness of the desalting compartments and the concentrating compartments was 5 mm. The filling height of the ion-exchange resin was 60 cm.

Desalting compartments: a resin mixture including the anion-exchange resin and the cation-exchange resin at a ratio of Anion-exchange resin:Cation-exchange resin=8:2 (dry weight ratio) was charged into a region of the water-flow channel of each desalting compartment which extends 30 cm from the entry-side end, and a resin mixture including the anion-exchange resin and the cation-exchange resin at a ratio of Anion-exchange resin:Cation-exchange resin=5:5 (dry weight ratio) was charged into the other region, that is, the exit-side region, of the water-flow channel.

Concentrating compartments: a resin mixture including the anion-exchange resin and the cation-exchange resin at a ratio of Anion-exchange resin:Cation-exchange resin=5:5 (dry weight ratio) was charged.

While a current was applied to the electrodeionization device at a current density of 1200 mA/dm$^2$, water to be treated having a boron concentration of 10 ppb was passed downwardly through the desalting compartments at an LV of 100 m/hr, and 20% of the amount of water discharged from the desalting compartments was passed upwardly through the concentrating compartments at an LV of 20 m/hr. The remainder of the water discharged from the desalting compartments was discharged as treated water.

The treated water (the water discharged from the desalting compartments) had a boron concentration of 1 ppt or less. Thus, a boron rejection percentage of 99.99% was achieved.

Comparative Example 1

Water to be treated was passed through an electrodeionization device having the same structure as in Example 1 under the same conditions as in Example 1, except that an anion-exchange resin and a cation-exchange resin that both had a particle size of 500 to 600 μm were used. The treated water had a boron concentration of 9 ppt. The boron rejection percentage was 99.9%, which was at the same level as the boron rejection percentages achieved by the electrodeionization devices proposed in the related art.

Although the present invention has been described in detail with reference to particular embodiments, it is apparent to a person skilled in the art that various modifications can be made therein without departing from the spirit and scope of the present invention.

The present application is based on Japanese Patent Application No. 2015-028736 filed on Feb. 17, 2015, which is incorporated herein by reference in its entirety.

The invention claimed is:

1. An electrodeionization device, comprising:
a cathode;
an anode; and
a plurality of cation-exchange membranes and a plurality of anion-exchange membranes, the plurality of cation-exchange membranes and the plurality of anion-exchange membranes being arranged between the cathode and the anode so as to form concentrating compartments and desalting compartments, the concentrating compartments and desalting compartments being arranged alternately, the desalting compartments being filled with an ion-exchange resin,
wherein the ion-exchange resin has an average particle size of 150 to 250 μm,
the ion-exchange resin has a uniformity coefficient of 1.1 or less,
the ion-exchange resin is a resin mixture of an anion-exchange resin and a cation-exchange resin,
the ion-exchange resin on an entry side of the desalting compartments in a water-flow direction is a resin mixture of an anion-exchange resin and a cation-exchange resin at a ratio of Anion-exchange resin:Cation-exchange resin=60 to 90:40 to 10 (dry weight ratio), and
the ion-exchange resin on an exit side of the desalting compartments is a resin mixture of an anion-exchange resin and a cation-exchange resin at a ratio of Anion-exchange resin:Cation-exchange resin=40 to 60:60 to 40 (dry weight ratio).

2. The electrodeionization device according to claim 1, wherein the concentrating compartments are filled with an ion-exchange resin having an average particle size of 100 to 300 μm.

3. The electrodeionization device according to claim 2, wherein the ion-exchange resin filled in the concentrating compartments has a uniformity coefficient of 1.1 or less.

4. The electrodeionization device according to claim 2, wherein the ion-exchange resin filled in the concentrating compartments is a resin mixture of an anion-exchange resin and a cation-exchange resin.

5. The electrodeionization device according to claim 4, wherein the ion-exchange resin filled in the concentrating compartments is a resin mixture of an anion-exchange resin and a cation-exchange resin at a ratio of Anion-exchange resin:Cation-exchange resin=40 to 70:60 to 30 (dry weight ratio).

6. A method for producing deionized water using the electrodeionization device according to claim 1, the method comprising:
passing water to be treated through the desalting compartments of the electrodeionization device;
passing part of water discharged from the desalting compartments through the concentrating compartments in a direction opposite to a direction in which the water-to-be-treated is passed through the desalting compartments; and discharging the remainder of the water discharged from the desalting compartments as treated water.

7. A pure-water production system comprising the electrodeionization device according to claim 1, and a reverse-osmosis membrane separation device disposed upstream of the electrodeionization device.

8. The electrodeionization device according to claim 1, wherein each of the desalting compartments is defined between an adjacent pair of the anion-exchange membrane and the cation-exchange membrane, and each of a thickness of the desalting compartments and the concentrating compartments is 2.0 to 8.0 mm.

9. The method according to claim 6, wherein the water to be treated contains boron, a boron concentration in the water to be treated is 10-20 ppb, and a boron concentration in the treated water is 1 ppt or less.

* * * * *